(12) United States Patent
Cott et al.

(10) Patent No.: US 7,677,647 B2
(45) Date of Patent: Mar. 16, 2010

(54) ADJUSTABLE MOUNTING RESTRAINT DEVICE

(75) Inventors: Bennett C. Cott, Goddard, KS (US); Michael David Case, Kechi, KS (US); Joshua John Pasa, Davenport, IA (US); Kyle Brenner, Silvis, IL (US)

(73) Assignee: CNH America LLC, New Holland, PA (US)

( * ) Notice: Subject to any disclaimer, the term of this patent is extended or adjusted under 35 U.S.C. 154(b) by 59 days.

(21) Appl. No.: 12/023,434

(22) Filed: Jan. 31, 2008

(65) Prior Publication Data

US 2009/0195024 A1 Aug. 6, 2009

(51) Int. Cl.
B60R 27/00 (2006.01)
(52) U.S. Cl. .................................. 296/190.08
(58) Field of Classification Search ............. 280/748, 280/753, 751; 180/268, 269, 270, 271, 281; 104/241; 297/464, 470, 487, 488
See application file for complete search history.

(56) References Cited

U.S. PATENT DOCUMENTS

| 0,296,975 | A | 4/1884 | Lampton |
| 3,165,333 | A | 1/1965 | Dalgleish |
| 4,509,798 | A | 4/1985 | Strothers |
| 4,537,446 | A | 8/1985 | Roney et al. |
| 4,813,746 | A | 3/1989 | Mulholland |
| 5,607,203 | A | 3/1997 | Sedlack |
| 5,655,817 | A | 8/1997 | Nienow |
| 6,732,829 | B2 * | 5/2004 | Bares .......................... 180/271 |
| 2004/0075266 | A1 * | 4/2004 | Arand ...................... 280/801.1 |
| 2004/0099461 | A1 * | 5/2004 | Miiller et al. ................ 180/272 |
| 2007/0145805 | A1 | 6/2007 | Bower |

FOREIGN PATENT DOCUMENTS

DE 3929957 C2 3/1991

* cited by examiner

*Primary Examiner*—Lori L Lyjak
(74) *Attorney, Agent, or Firm*—Michael G. Harms; John William Stader; Patrick M. Sheldrake

(57) ABSTRACT

A work vehicle includes a frame, a cab structure connected to the frame and a seat connected to the frame. A substantially rigid restraining device of unitary construction is pivotably connected behind the seat to any one of the frame, the cab structure, or the frame and the cab structure. The pivotable connection between the restraining device and the frame and/ or the cab structure is adjustable.

20 Claims, 7 Drawing Sheets

ADJUSTABLE MOUNTING RESTRAINT DEVICE

FIELD OF THE INVENTION

The present invention relates generally to work vehicles. It relates more particularly to a restraint device mounted in a frame of a work vehicle.

BACKGROUND OF THE INVENTION

Work vehicles, such as skid steer loaders, have a cab structure for protecting an operator. The work vehicles typically include a pair of controls configured to be grasped in each hand of the operator, typically requiring a relatively small amount of wrist movement to effect control of the work vehicle. Operator fatigue may be encountered due to extended periods of work vehicle operation. In addition, the work vehicle typically includes a seat belt or other device is typically provided to prevent the operator from being thrown from the vehicle.

Accordingly, it would be advantageous to provide a work vehicle operator with both safety as well as enhanced comfort.

SUMMARY OF THE INVENTION

One embodiment of the present invention relates to a work vehicle including a frame. A cab structure is connected to the frame. A seat is connected to the frame. A substantially rigid restraining device of unitary construction is pivotably connected behind the seat to any one of the frame, the cab structure, or the frame and the cab structure. The pivotable connection between the restraining device and the frame and/or the cab structure is adjustable.

Another embodiment of the present invention further relates to a work vehicle including a frame. A cab structure is connected to the frame. A seat is connected to the frame. A substantially rigid restraining device of unitary construction is pivotably connected behind the seat to any one of the frame, the cab structure, or the frame and the cab structure, the restraining device being configured to pivot over the seat. The pivotable connection between the restraining device and the frame and/or the cab structure is adjustable.

An advantage of the present invention is a restraint device accommodating operators of different size.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
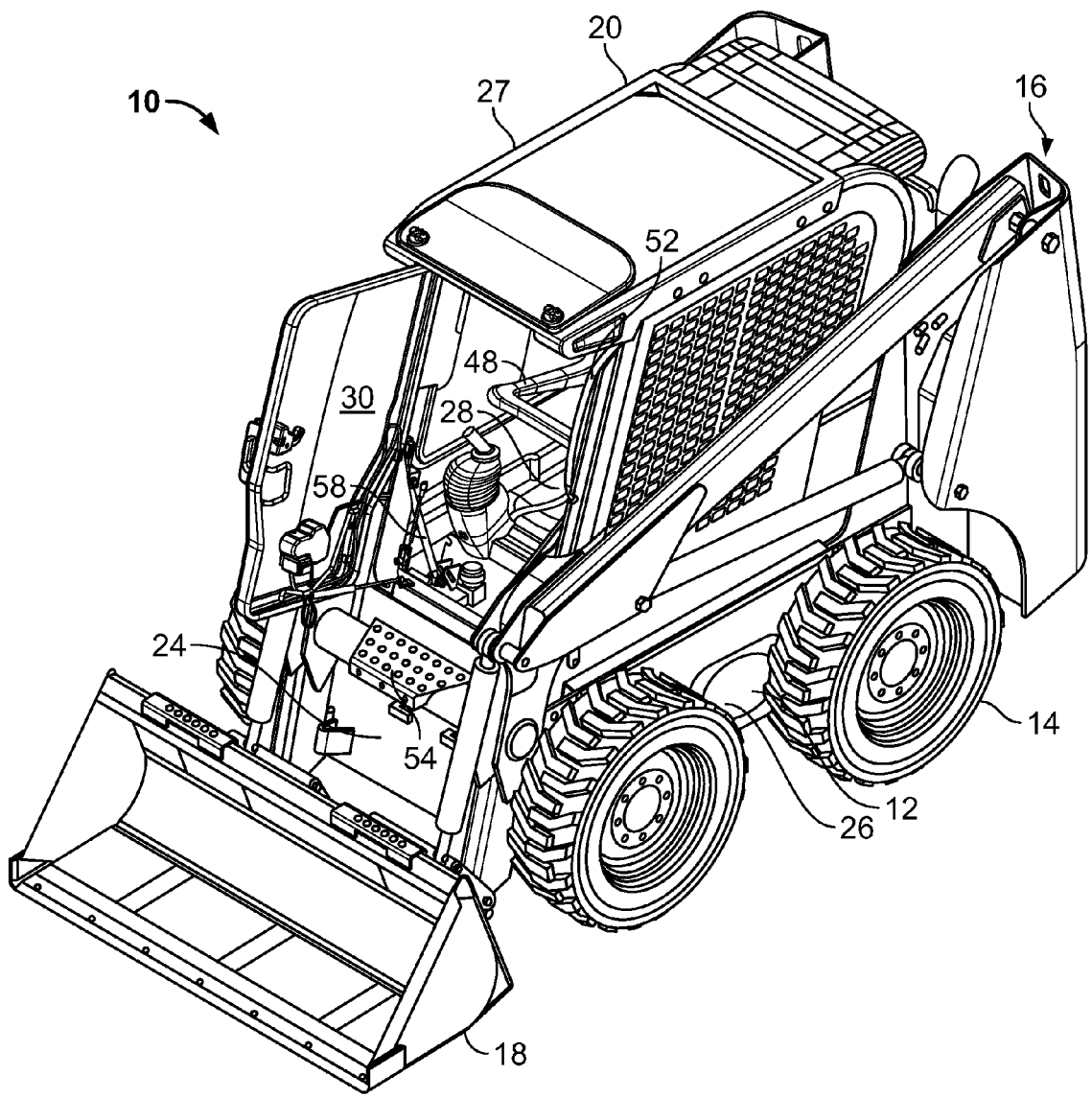
FIG. 1 is a top perspective front view of an embodiment of a work vehicle of the present invention.

FIG. 1 shows an exemplary work vehicle 10 including a frame 12 that rotatably carries a plurality of wheels 14. An implement 18 including a structure 16 having an arrangement of structural members and actuators controllable by an operator (not shown) to manipulate implement 18 to perform work is also connected to frame 12. Implement 18 includes, but is not limited to, brooms, augers, rakes, bales spikes, buckets, blades, hammers, forks, hoes, rock wheels, stump grinders and tillers. In an alternate embodiment, structure 16 may maintain implement 18 in a fixed or non-moving relationship with frame 12. Frame 12 structurally supports a cab structure 20 to surround and protect the operator. The cab structure 20 is configured to pivot with respect to frame 12. Frame 12 includes a front end 24 disposed proximate to implement 18. Front end 24 is disposed between opposed sides 26, 27. A seat 28 is disposed interior of cab structure 20 which is accessible via a door 30. Door 30 is pivotably connected to cab structure 20, although in alternate embodiments, the door 30 may be slidably connected or in some other connective relationship with the cab structure 20. In further alternative embodiments, the door 30 may be deleted. As will be discussed in further detail below, a restraining device 48 is pivotably connected to frame 12 and/or cab structure 20 to pivot over seat 28 in an adjustable manner.

In one embodiment, cab structure 20 pivots or rotates toward front end 24. However, one having ordinary skill in the art can appreciate that cab structure 20 may be configured to pivot or rotate in other directions. In other words, cab structure 20 may be configured to pivot or rotate in directions other than toward front end 24, such as toward an opposite end 22 (FIG. 2), or toward sides 26, 27.

Figure 2:
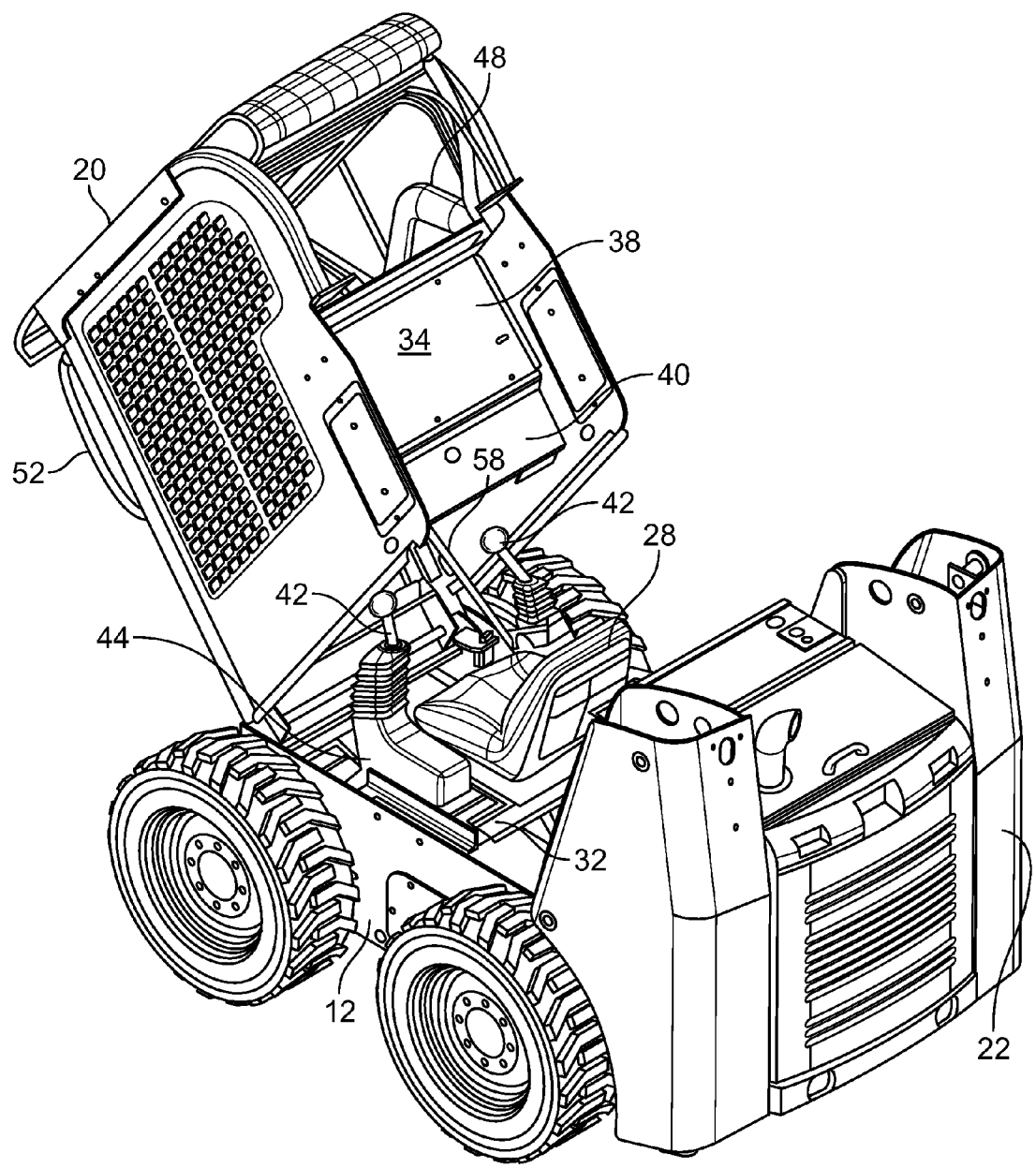
FIG. 2 is a top perspective rear view of an embodiment of a work vehicle, lifting structure removed, of the present invention.

FIG. 2 shows a top perspective rear view of the exemplary work vehicle 10 of FIG. 1 with cab structure 20 rotated away from frame 12 and structure 16 removed for clarity. As shown in FIG. 2, seat 28 is disposed between a pair of operator controls 42 that each includes a respective housing 44. As further shown, seat 28 includes a base 32 that is secured to the seat. In an alternate embodiment, base 32 and seat 28 are of unitary construction.

Figure 3:
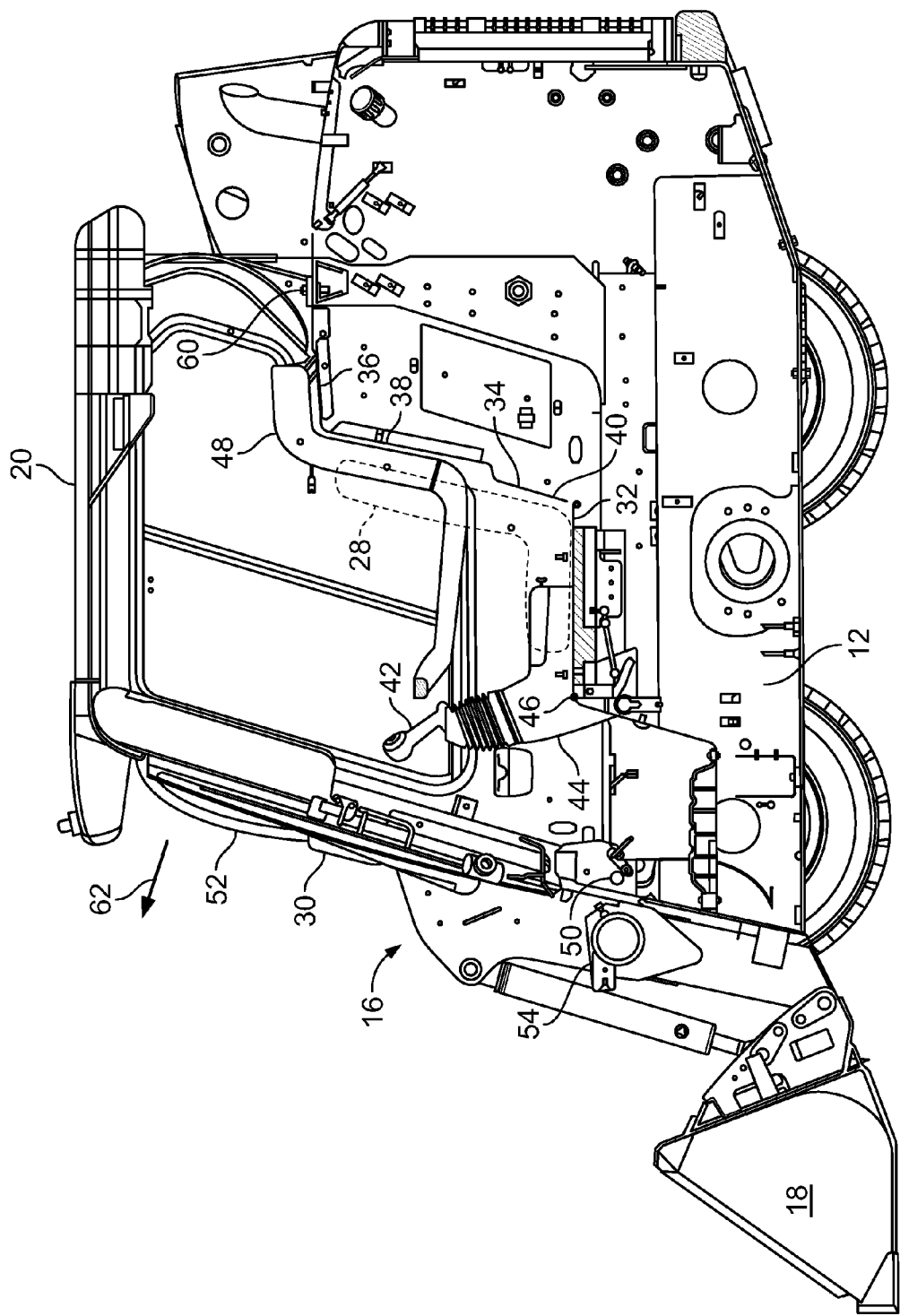
FIG. 3 is a top elevation view of a cutaway of an embodiment of a work vehicle of the present invention.

FIG. 3 shows a partial cutaway view of work vehicle 10 provided for clarity. As shown in FIG. 3, a pivoting connection 46 is disposed between base 32 and frame 12. Pivoting connection 46 may be a hinge, a piano hinge, or other pivoting arrangement as would be appreciated by one of ordinary skill in the art.

As shown in FIG. 3, cab structure 20 includes a panel 34 that is disposed behind seat 28 when cab structure 20 abuts frame 12. Panel 34 includes an upper portion 36 extending to a middle portion 38 that further extends to a lower portion 40 that is adjacent to base 32 supporting seat 28. In alternate embodiments, panel 34 may be modified or otherwise deleted. When cab structure 20 is rotated about pivoting connection 50, panel 34 is raised above seat 28. An operator restraining device 48 is pivotably secured to upper portion 36 to pivot over seat 28. In an alternate embodiment in which panel 34 is deleted, restraining device 48 is pivotably connected to frame 12. In another embodiment, restraining device 48 is pivotably connected to frame 12 and panel 34.

To effect cab structure 20 pivot or rotation, fasteners 60 securing upper portion 36 to frame 12 are loosened. An operator (not shown) may then place his feet on a step 54 disposed on structure 16 and grasp hand rail 52 disposed along a vertical corner of cab structure 20 and apply an opening force 62 to pivot or rotate the cab structure 20 in the direction indicated by arrow associated with opening force 62. When the operator applies the opening force 62, a strut 58 (FIG. 1) extends, contributing an opening force along its length to help move cab structure 20 from a closed or operating position (FIG. 1) to an open position (FIG. 2). In one embodiment, the open position represents a predetermined degree of rotation X° (FIG. 2) of cab structure 20 between about 55 to about 60 degrees with respect to the frame 12 (FIG. 2) as compared to the closed position (FIGS. 1 and 3).

Figure 4:
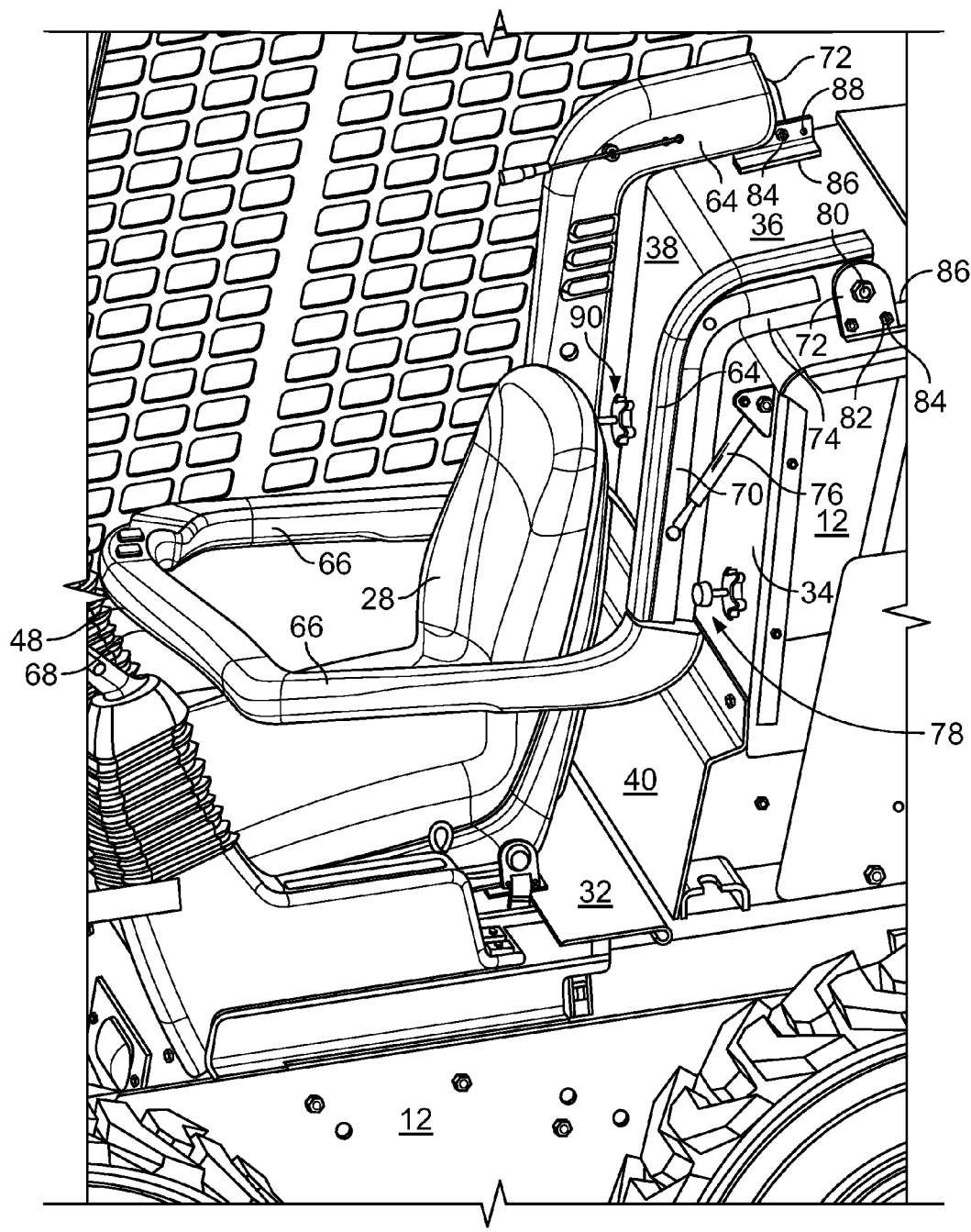
FIG. 4 is a top perspective view of a cutaway of an embodiment of a work vehicle with a restraining device in a forward-adjusted position of the present invention.

As further shown in FIG. 4, restraining device 48 includes opposed L-shaped first portions 64 extending to armrests 66. A connecting member 68 is disposed between corresponding ends of armrests 66 opposite first portions 64. A unitary tube 70 extends through corresponding first portions 64, armrests 66 and connecting members 68. Tube 70 substantially spans the length of restraining device 48. Tube 70 may be covered with a layer of resilient material 74, such as by molding, to provide a contoured surface that is comfortable when in contact with the operator. In one embodiment, material 74 is applied by molding, although other processes may be used. Ends of first portions 64 opposite armrests 66 are pivotably connected to corresponding pivoting brackets 72. Pivoting brackets 72 include a pivot 80 for providing a pivotable connection with restraining device 48. Pivoting brackets 72 further include a plurality of apertures 82 that are aligned with corresponding openings 88 of a bracket 86 connected to upper portion 36 of panel 34 for receiving fasteners 84 therethrough. As further shown in FIG. 4, pivoting bracket 72, and therefore the pivotable connection, is disposed in a forward-adjusted position with respect to seat 28. In contrast, FIG. 5 shows pivoting bracket 72 disposed in an aft-adjusted position with respect to seat 28.

As also shown in FIG. 4, pivoting brackets 72 include a row of horizontally disposed apertures 82, and brackets 86 include a horizontally disposed row of openings 88. However in alternate embodiments, those skilled in the art can appreciated that either or both of pivoting brackets 72 and brackets 86 may include corresponding vertically disposed apertures 82 and openings 88. This combination of vertical and/or horizontal adjustment of pivot 80 provides an adjustable pivoting connection for enhanced operator comfort, accommodating for a considerable range of different operator sizes, as well as accommodating unique comfort adjustment preferences for the operators. More specifically, the adjustable pivoting connection permits use of a single construction of restraining device 48 that may save inventory costs.

As shown in FIG. 4, a strut 76 is pivotably disposed between tube 70 along first portion 64 and middle portion 38 of panel 34. Strut 76 is shown in a compressed position, providing an opening force to assist the operator in raising restraining device 48.

Figure 5:
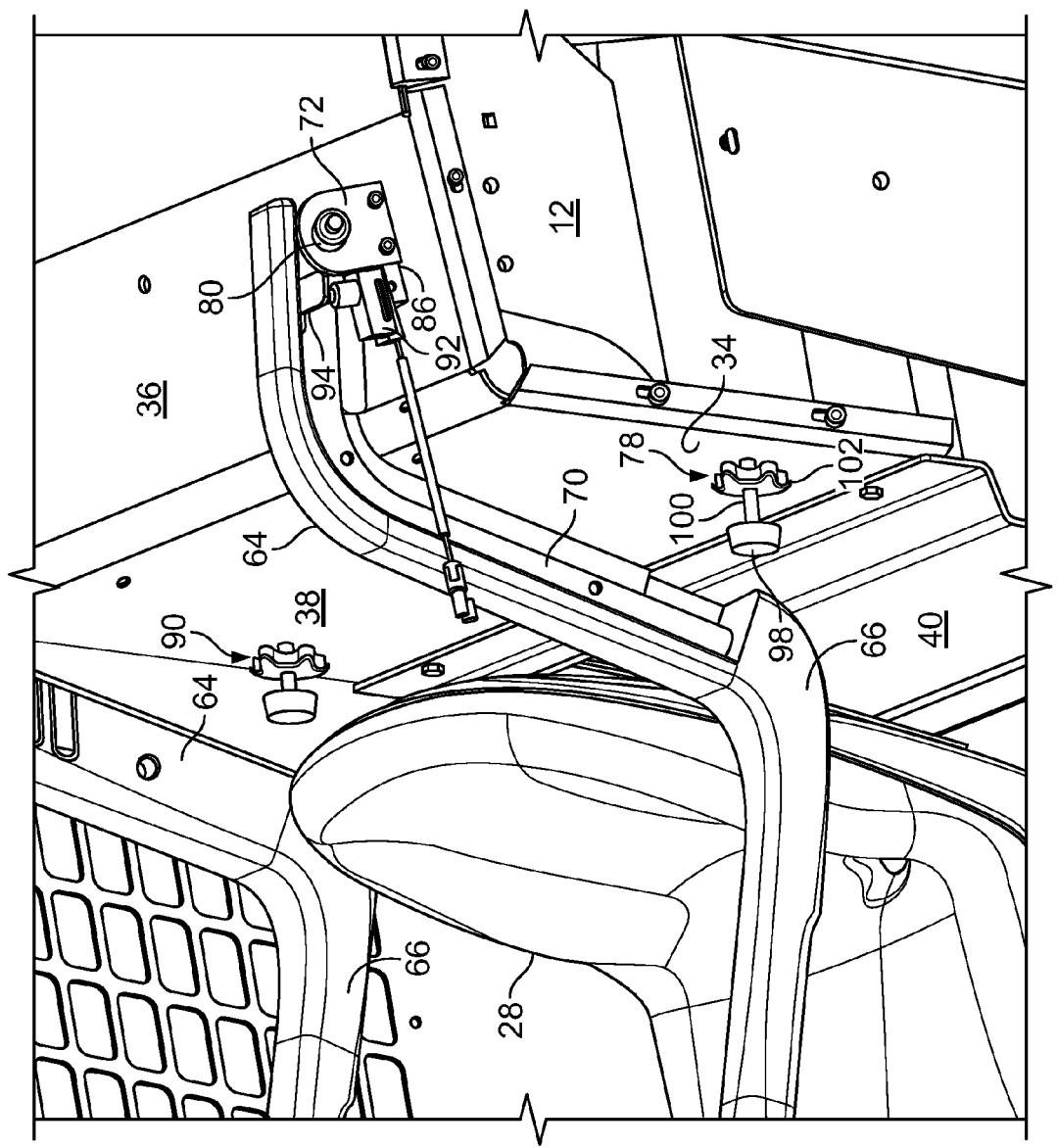
FIG. 5 is a top perspective view of a cutaway of an embodiment of a work vehicle with a restraining device in an aft-adjusted position of the present invention.

As shown in FIG. 5, a pair of stops 78, 90 provide additional adjustment for restraining device 48 to further provide enhanced operator comfort. Stops 78, 90 adjustably extend from middle portion 38 of panel 34, contacting the junction between first portion 64 and armrest 66. Stop 78 is shown in an extended position, while stop 90 is shown in a substantially retracted position. Each stop 78, 90 includes a contact 98 that is secured to a threaded shaft 100 and a threaded insert (not shown) disposed behind middle portion 38. A locking device 102 is threadedly engaged with shaft 100. To effect desired adjustment of stop 78, 90, contact 98 is rotated in one direction until contact 98 extends a selected distance from middle portion 38. Rotation of locking device 102 in one direction, which as shown is a knob for ease of rotational manipulation, urges locking device 102 to move with respect to contact 98 toward middle portion 38, acting as a lock nut. Rotation of locking device 102 in the other direction urges locking device 102 to a loosened position, permitting rotational adjustment of threaded shaft 100 to adjust the position of contact 98 with respect to middle portion 38.

In response to extending stops 78, 90 away from middle portion 38 while maintaining pivoting brackets 72 in respective fixed positions, stops 78, 90 act as a fulcrum with respect to restraining device 48 and pivoting bracket 72. That is, armrests 66 are correspondingly raised to a position to enhance operator comfort. In other words, once pivoting bracket 72 has been mounted, each stop 78, 90 is configured to limit pivoting travel of each armrest 66 to a predetermined lowered position. In the exemplary embodiment, to the extent permitted by restraining device 48, and as shown in FIG. 4, stops 78, 90 may be independently adjusted so that the ends of the armrests 66 may be raised to different levels. In an alternate embodiment in which tube 70 does not extend through connecting member 68, the extent or adjustability may be further increased.

As shown in FIG. 5, a sensor 92 is disposed in close proximity of the pivotable connection to indicate when the restraining device 48 is disposed in an operating position. A tab 94 contacts a plunger or other portion of sensor 92 to indicate when the restraining device 48 is disposed in an operating position. Sensor 92 may be connected with the ignition system of the work vehicle, preventing operation of the work vehicle until sensor 92 actuated by tab 94. In alternate embodiments, other arrangements may be used or the sensor 92 may be deleted.

In an alternate embodiment, it is to be understood that stops 78, 90, or a single stop may be disposed along different portions of restraining device 48, so long as the position of stops armrests 66 are adjustable.

It is also to be understood that the length of portions of restraining device 48 may also be adjustable. For example, each first portion 64 and armrest 66 may include an adjustable construction, such as a turnbuckle or concentrically slidably disposed tubes with associated apertures formed to receive a pin, not shown, although other constructions may be used.

It is also to be understood that a harness may also be used in addition to restraining device 48, although, such harness is typically undesirable, due to the additional heat generated by contact with the operator.

Figure 6:
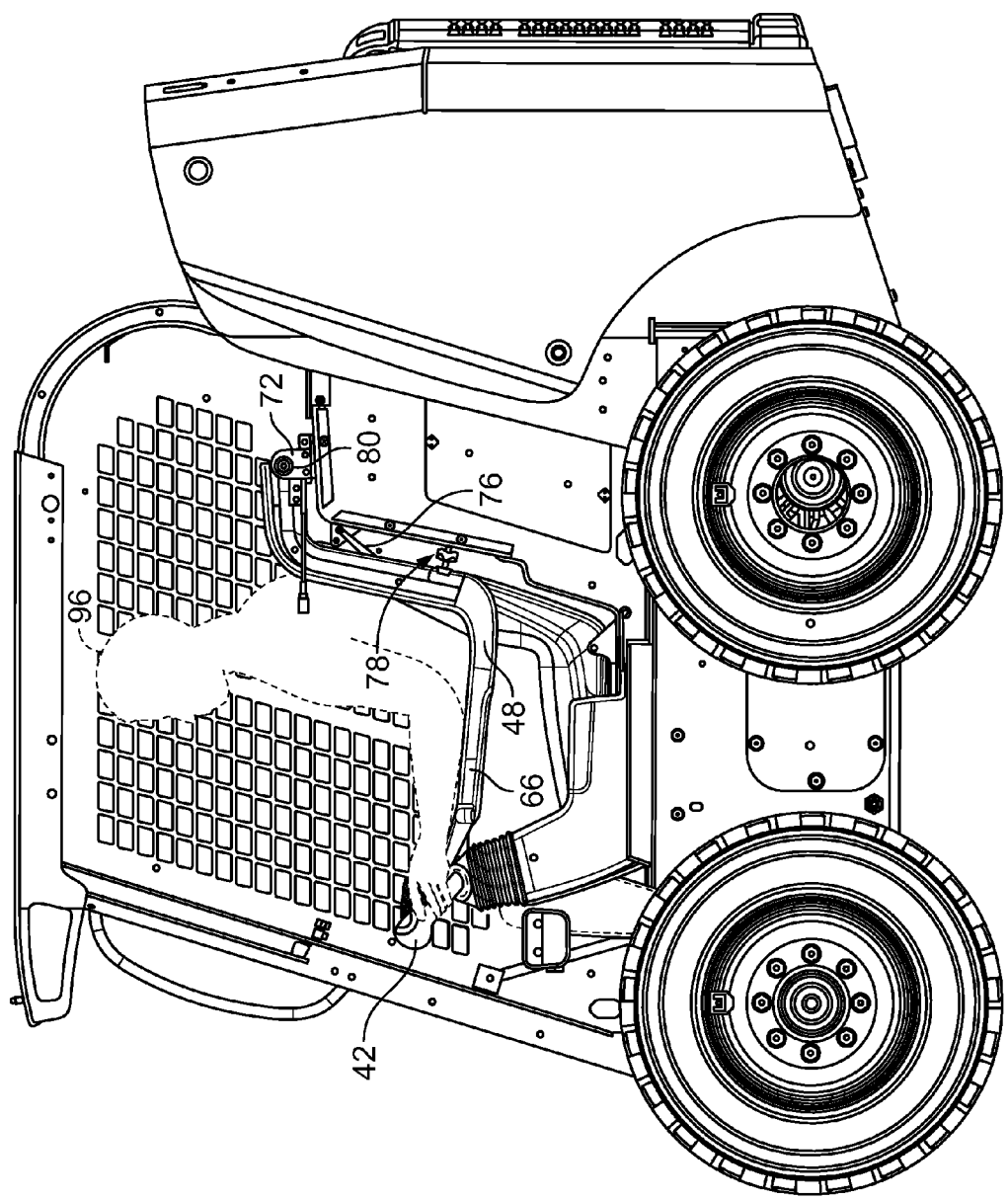
FIG. 6 is a top elevation view of a cutaway of an embodiment of a work vehicle containing an operator disposed in a forward-adjusted position of the present invention.
Figure 7:
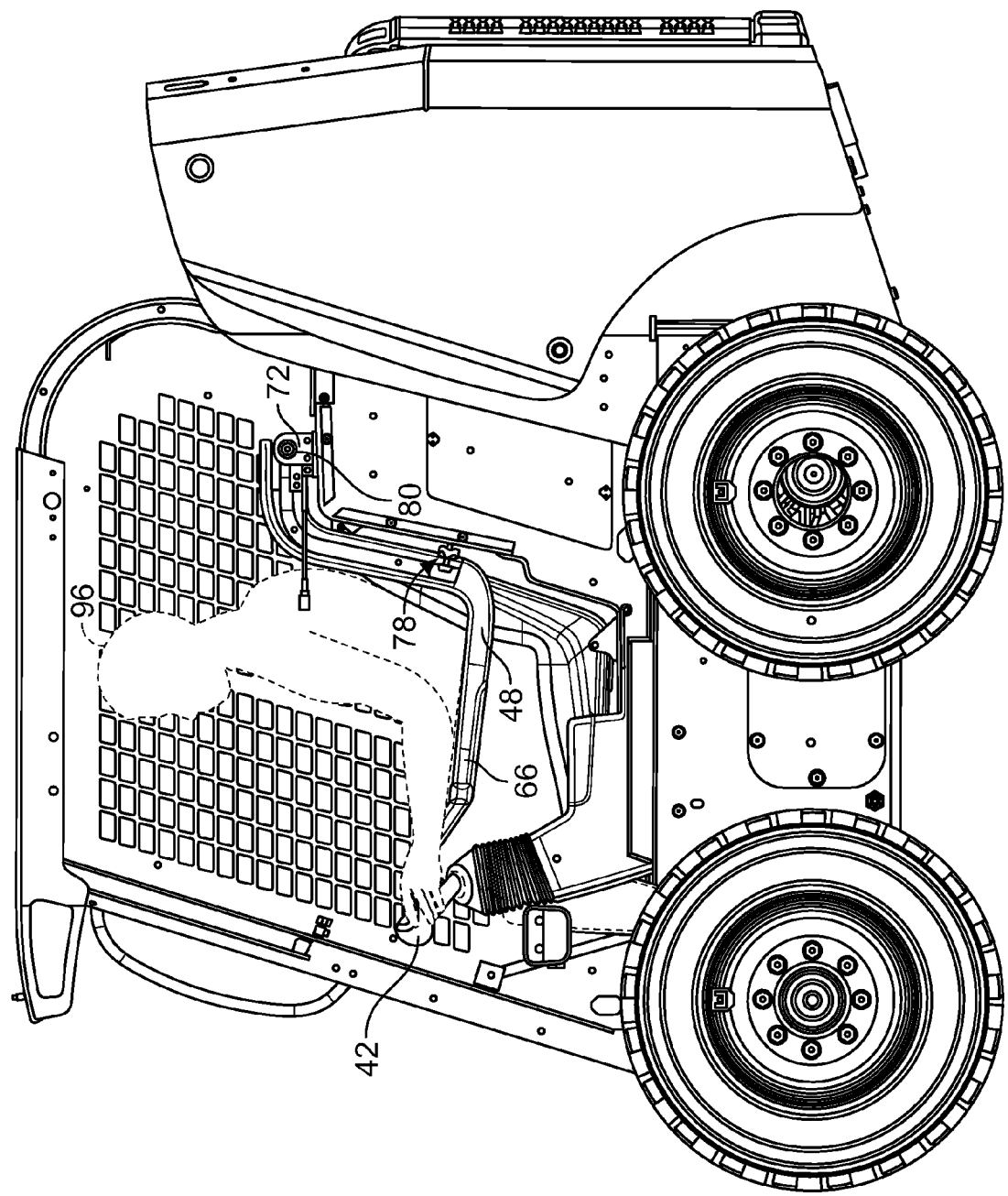
FIG. 7 is a top elevation view of a cutaway of an embodiment of a work vehicle containing an operator disposed in an aft-adjusted position of the present invention.

While not specifically shown in the exemplary embodiment, the adjustable pivoting connection also accommodates either of two different constructions of operator controls 42 configured for use with the work vehicle 10. One construction, referred to as mechanical controls, makes use of mechanical linkages to control the operation of the work vehicle, having a predetermined range of forward/aft adjustment from a home position shown in the figures. For example, in one embodiment, the predetermined range is about 13.25 inches, although in other embodiments, the predetermined range may be greater than or less than this amount. Another construction, referred to as pilot controls, makes use of hydraulics to control the operation of the work vehicle, having a predetermined range of forward/aft adjustment from a home position shown in the figures. For an example, in one embodiment, the predetermined range is about 5.25 inches, although in other embodiments, the predetermined range may be greater than or less than this amount. It is appreciated by those skilled in the art that the adjustable pivoting connection permits use of a single construction of restraining device 48 with use of either operator controls 42 construction. For example, as shown in FIG. 6, an operator 96 grasps operator controls 42 with restraining device 48 disposed in a forward-adjusted position similar to FIG. 4. Similarly, as shown in FIG. 7, operator 96 grasps operator controls 42 with restraining device 48 disposed in an aft-adjusted position similar to FIG. 5. By virtue of the different amount of armrest 66 support provided to operator 96, a position of comfort may be achieved for any combination of operator size, operator controls 42 construction, as well as unique preferences by the operator.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A work vehicle comprising:
   a frame;
   a cab structure connected to the frame;
   a seat connected to the frame; and
   a substantially rigid restraining device of unitary construction pivotably connected behind the seat to any one of the frame, the cab structure, or the frame and the cab structure;
   wherein the pivotable connection between the restraining device and at least one of the frame and the cab structure is adjustable.

2. The work vehicle of claim 1, wherein the cab structure and the seat are each pivotably connected to the frame.

3. The work vehicle of claim 1, wherein the restraining device is configured to pivot over the seat.

4. The work vehicle of claim 1, wherein a sensor is disposed in close proximity of the pivotable connection to indicate when the restraining device is disposed in an operating position.

5. The work vehicle of claim, wherein the pivotable connection is adjustable in a horizontal direction.

6. The work vehicle of claim 1, wherein the pivotable connection is adjustable in a both a vertical and a horizontal direction.

7. The work vehicle of claim 1, wherein the restraining device is substantially covered by a layer of material forming a contoured surface.

8. The work vehicle of claim 7, wherein the restraining device includes a tube substantially spanning the length of the restraining device.

9. The work vehicle of claim 7, wherein material is molded to the restraining device.

10. The work vehicle of claim 7, wherein the restraining device includes an armrest.

11. The work vehicle of claim 1, wherein a stop is configured to limit pivoting travel of the armrest to a predetermined lowered position.

12. The work vehicle of claim 11, wherein the stop is manually adjustable.

13. The work vehicle of claim 1, wherein each stop of a pair of stops is configured to limit pivoting travel of each armrest to a predetermined lowered position.

14. A work vehicle comprising:
    a frame;
    a cab structure connected to the frame;
    a seat connected to the frame; and
    a substantially rigid restraining device of unitary construction pivotably connected behind the seat to any one of the frame, the cab structure, or the frame and the cab structure, the restraining device being configured to pivot over the seat;
    wherein the pivotable connection between the restraining device and at least one of the frame and the cab structure is adjustable.

15. The work vehicle of claim 14, wherein the pivotable connection is adjustable in a horizontal direction.

16. The work vehicle of claim 14, wherein the pivotable connection is adjustable in a both a vertical and a horizontal direction.

17. The work vehicle of claim 14, wherein the restraining device includes an armrest.

18. The work vehicle of claim 14, wherein a stop is configured to limit pivoting travel of the armrest to a predetermined lowered position.

19. The work vehicle of claim 11, wherein the stop is manually adjustable.

20. The work vehicle of claim 1, wherein each stop of a pair of stops is configured to limit pivoting travel of each armrest to a predetermined lowered position.

* * * * *